Jan. 19, 1926. Re. 16,254

F. B. LEECH ET AL

PARKING LIGHT

Original Filed June 17, 1921

Inventor

Francis B. Leech
Elijah W. Titus

By Spear, Middleton, Donaldson & Hall

Attorney

Reissued Jan. 19, 1926.

Re. 16,254

UNITED STATES PATENT OFFICE.

FRANCIS B. LEECH AND ELIJAH W. TITUS, OF WASHINGTON, DISTRICT OF COLUMBIA, ASSIGNORS TO RAE-LITE MANUFACTURING CO., OF BALTIMORE, MARYLAND, A CORPORATION OF MARYLAND.

PARKING LIGHT.

Original No. 1,447,589, dated March 6, 1923, Serial No. 478,275, filed June 17, 1921. Application for reissue filed August 13, 1924. Serial No. 731,881.

*To all whom it may concern:*

Be it known that we, FRANCIS B. LEECH and ELIJAH W. TITUS, citizens of the United States, and residents of Washington, in the District of Columbia, have invented certain new and useful Improvements in Parking Lights, of which the following is a specification.

Our invention relates to new and useful improvements in lights and more particularly to a parking light for automobiles, the principal object being the provision of a light of this character which will not require the use of electric current or oils, and will be readily visible at all times.

Another object consists in the formation of the globe in sections which may be easily assembled and the provision of novel means for supporting a luminous substance therein, the said substance being yieldably supported to prevent damage thereto when traveling over rough surfaces.

A still further object resides in the provision of a simple and inexpensive form of bracket for connecting the light to the mud guard or other part of the automobile.

With the above and other objects in view, which will appear as the description proceeds, our invention consists of the novel details of construction and arrangement of parts described in the following specification, and illustrated in the accompanying drawings, and while we have illustrated and described the preferred embodiments of the invention, it will be understood that such changes may be made as will fall within the scope of the appended claims.

Figure 1:
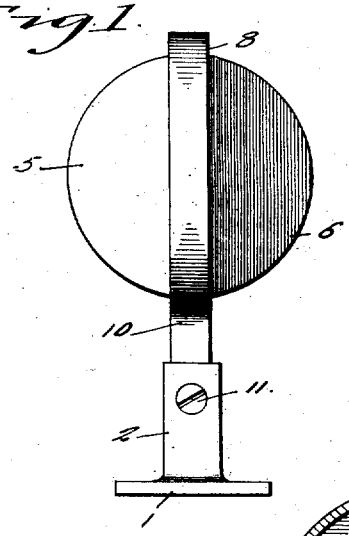
Figure 1 is a side elevation.
Figure 2:
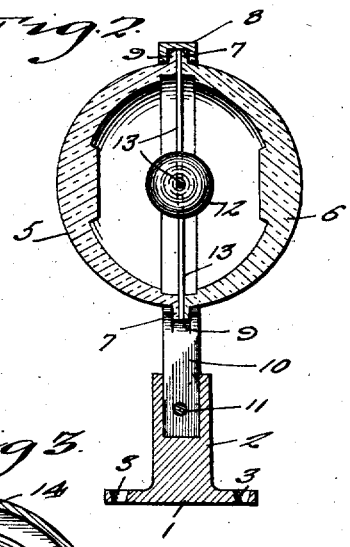
Fig. 2 is a longitudinal vertical section with parts shown in elevation.
Figure 3:
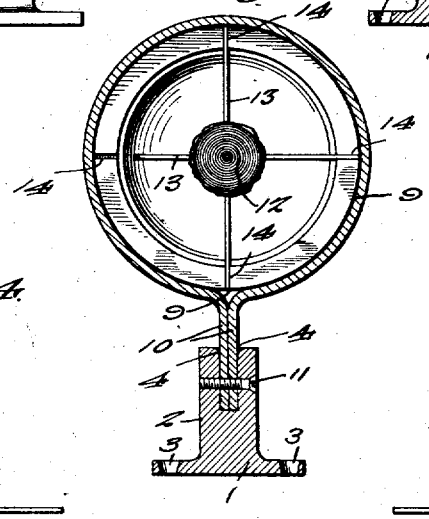
Fig. 3 is a transverse vertical section with parts shown in elevation.

Our light comprises a bracket and globe carried thereby, the globe having supported therein an illumination of a character to be later described. The bracket comprising the base 1 and standard 2, the base having suitable perforations 3 for the screws or other fastening means by which the bracket is secured to the mud guard or other part of the automobile, and the standard having a socket 4 in the upper end thereof.

The globe is formed in sections 5 and 6 of glass, one of which will preferably be red and the other white, and each of the sections has an outwardly extending flange 7 to be engaged by the band 8 for connecting the sections. This band 8 is of channel formation, the flanges 7 being received in the channel in the inner face of the band. A packing ring 9 of rubber or other suitable material is placed between the flanges and band to prevent chipping of the glass and to prevent rattling. The ends of the band are bent to form the extensions 10 which will be received in the socket 4 of the standard, said extension being held in the socket by the screw 11 which passes transversely through the standard and through openings in the extensions. It will be understood that the band is of spring material so that when the extensions 10 are brought together the band will lightly grip the flanges and connect the sections of the globe. A mass of luminous material 12 is adapted to be supported in the globe, said material being phosphorous or any other similar material or composition of materials. The luminous material is carried on the rods 13, the ends of which are received in notches 14 formed in the outer faces of the flanges 7 the wires being securely held against displacement when the sections of the globe are connected together by the band. While we have illustrated two wires as being used and crossed, it will be understood that any number might equally as well be used without departing from the spirit of the invention.

Figure 4:
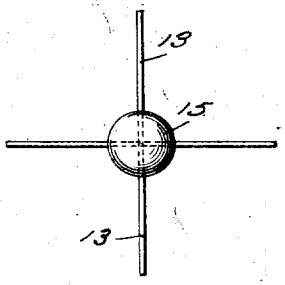
Fig. 4 is a front elevation of a modified form of illumination.

In Figure 4 we have illustrated a slightly modified form of illuminator wherein instead of a mass of luminous material being carried by the rods 13, a round ball of glass or metal is carried thereby and this plate is coated with the luminous material.

Figure 5:
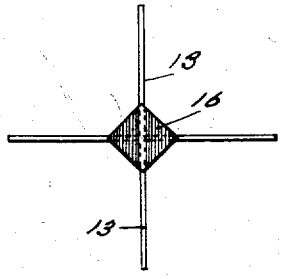
Fig. 5 is a front elevation of a still further modified form of illumination.

Figure 5 shows a still further slightly modified form of illumination wherein a square plate 16 of glass or metal, coated with the luminous material, is carried by the rods 13.

From the above detailed description, it will be seen that we have provided a novel form of light, of simple and inexpensive construction, adapted to be easily secured to the automobile and be readily visible without the use of electric current or oils. The parts may be easily assembled and the luminous mass or coated plates are yieldably supported in the globe in such a manner that it will not be easily broken when going over rough surfaces. While we have described the light as particularly adapted for use as a parking light, it will be understood that it might equally as well be used for other purposes.

Having fully described our invention, what we claim as new and desire to secure by Letters Patent is:

1. In a parking lamp, the combination of a casing including opposed sections of different colors, a retaining band passing over said casing at its color junction, said band being in interlocking engagement with said casing, the end portions of said band extending downwardly to form attaching means for the casing, a base having a portion adapted to be attached to an automobile fender or the like, and an upstanding socketed portion, the downwardly extending portion of the band entering the socket and secured to the walls of the upstanding portion.

2. In a parking lamp, the combination of a casing including opposed sections of different colors, a retaining band passing over said casing at its color junction, said band being in interlocking engagement with said casing, said band hugging the casing and having its downwardly extending ends secured against separation from the casing, an illuminator mounted in the casing, means for supporting said illuminator centrally of said casing, said supporting means being disposed between and clamped by the opposed lenses.

FRANCIS B. LEECH.
ELIJAH W. TITUS.